Patented July 19, 1938

2,124,400

UNITED STATES PATENT OFFICE 2,124,400

INSECTICIDAL, FUNGICIDAL, DISINFECTANT MATERIAL

Leon C. Heckert, Pittsburg, Kans., and Charles H. Peet, Bristol, Pa., assignors to Rohm & Haas Company, Philadelphia, Pa.

No Drawing. Application January 3, 1935, Serial No. 236

5 Claims. (Cl. 167—30)

This invention relates to new insecticides. In copending application Serial No. 367,626, filed May 31, 1929, there is disclosed a new insecticide comprising an organic thiocyanate, the organic residue of which is aromatic and contains a negative group. In U. S. Patent 1,808,893, there is disclosed a second type of thiocyanates which are effective insecticides, the organic residue of which is aliphatic and also contains a negative group.

According to Bulletin 1313, U. S. Dept. of Agriculture, ethyl and methyl thiocyanates were tried out as fumigants but their offensive odor, volatility and irritant action render them unsuited as contact and household insecticides. We have found that the higher esters, starting with the butyl ester in contrast to the lower esters, can be employed as contact poisons. The degree of non-volatility necessary in a contact poison begins with the butyl ester and this characteristic is also possessed by the esters above butyl. We have also found that these higher esters do not possess the same offensive odor as the lower esters.

The thiocyanates described herein are the esters of thiocyanic acid and aliphatic alcohols containing more than three carbon atoms such as the amyl alcohol, capryl alcohol, etc., or of alicyclic alcohols such as, for instance, cyclohexanol. The aliphatic alcohols may be primary, secondary or tertiary and may have a normal or a branched chain. Among the compounds which have been found effective as insecticides are n-butyl thiocyanate, n- and iso-amyl thiocyanates, tertiary butyl thiocyanate, tertiary amyl thiocyanate, capryl thiocyanate, cyclohexyl thiocyanate, etc. These thiocyanates are substantially insoluble in water but may be used in solutions of organic solvents, in mixtures, or in aqueous emulsions provided a suitable emulsifying agent is used. Sodium lauryl sulphate has been found effective as an emulsifying agent and kerosene or similar hydrocarbons are suitable for solvents.

The invention may be illustrated by the following examples but it is not limited to the materials or the concentrations shown since other solutions or emulsions, or mixtures of thiocyanates may be made within the scope of the appended claims.

*Example 1.*—A 4% solution of n-butylthiocyanate in kerosene was prepared, and 12 cc. of this was sprayed into a chamber according to the method of fly testing devised by Peet and Grady (Jour. Econ. Entomology 21—598—625, 1928). After 10 minutes, above 95% of the flies in the chamber were paralyzed and lying on the floor. Of these a large number proved to be dead after 24 hours.

*Example 2.*—An emulsion of the same n-butylthiocyanate was prepared in the following way: 1 gm. of sodium lauryl sulphate was dissolved in 1¼ liters of water, and to this was added 3 gms. of n-butylthiocyanate. The mixture was thoroughly shaken until a good emulsion resulted and was atomized from a spray gun onto Catalpa leaves which were badly infested with aphis. After 24 hours over 95% of the aphis were killed. The foliage was not injured in any way.

*Example 3.*—The same procedure was used as in Example 1 but replacing the n-butylthiocyanate by isoamylthiocyanate, with similar results.

*Example 4.*—Results similar to those obtained in Example 2 may be obtained by replacing the n-butyl thiocyanate with amyl thiocyanate.

*Example 5.*—The same procedure was used as in Example 1, but the n-butyl thiocyanate was replaced by cyclohexylthiocyanate. The results obtained were similar to those shown in Example 1. The cyclohexylthiocyanate used in this experiment was obtained by the following method: A mixture of 163 g. of cyclohexyl bromide, 100 g. of sodium thiocyanate, and 750 cc. of ethyl alcohol was stirred at the refluxing temperature for 24 hours. The salt was removed by filtration, concentration of the filtrate, and a second filtration. The product decomposed to some extent when distilled in vacuo. The fraction (35 g.) boiling 120–135° at 1 mm. gave a sulfur analysis corresponding to that calculated for cyclohexyl thiocyanate.

*Example 6.*—By replacing the n-butyl thiocyanate shown in Example 1 with capryl thiocyanate, similar results are obtained. The capryl thiocyanate employed in this example was prepared by the following method: A stirred reaction mixture consisting of 140 g. of capryl bromide, 58 g. of anhydrous sodium thiocyanate, 50 cc. of n-butyl alcohol and 1 g. of copper powder was heated to 118° for 24 hours. The solid material was filtered and the filtrate concentrated at a reduced pressure. The residue was twice fractionated. The fraction (65 g.) which distilled at 137.5–139°/25 mm. gave the correct analysis for capryl thiocyanate.

*Example 7.*—Results similar to those shown in Example 2 may be obtained if the n-butyl thiocyanate is replaced by tertiary amyl thiocyanate.

*Example 8.*—Cetyl thiocyanate was prepared as follows: A mixture of 50 g. of cetyl bromide, 20 g. of sodium thiocyanate, 12 g. of ethyl alcohol, and 1 g. of copper dust was stirred and heated at refluxing temperature for 45 hours. The reaction mixture was allowed to cool and then was extracted with petroleum ether. The resulting solution was decolorized with carbon and concentrated, giving 43 g. of an oily liquid. The nitrogen analysis showed it was 90% cetyl thiocyanate.

Cetyl thiocyanate, made from cetyl bromide and of a purity above 90%, was emulsified with sodium lauryl sulphate so that the solution contained ¼% of the thiocyanate and 1/10 of sodium lauryl sulphate. This emulsion proved to be an effective aphicide in that it killed about 90% of chrysanthemum aphis.

*Example 9.*—Diisobutyl cyclohexylthiocyanate was prepared as follows: Forty grams of diisobutyl cyclohexanol prepared by catalytic hydrogenation of diisobutyl phenol was converted into the corresponding bromide by boiling with 150 cc. of 48% hydro-bromic acid for four hours. The organic layer was separated and the bromide purified by distillation. Twenty-one grams of diisobutyl cyclohexylbromide was in turn converted into diisobutyl cyclohexylthiocyanate by treatment with 10 g. of anhydrous sodium thiocyanate and 1 g. of copper powder in 10 cc. of butyl alcohol at 120° for 15 hours. The thiocyanate was isolated from the reaction mixture and purified by distillation.

If the cetyl thiocyanate of Example 8 is substituted by diisobutyl cyclohexyl thiocyanate, the kill of aphis is better than 90% within 24 hours.

It is not necessary that the pure cetyl alcohol be used but use may also be made of the alcohols derived from palmitic acid by hydrogenation, or from spermaceti by hydrogenation or by saponification.

The insecticidal compositions described herein may be used to eliminate flies and other flying insects as well as creeping and biting insects, such as bed bugs, roaches, ants, etc., from rooms by spraying the insecticides into the air, or onto the insects or they may be used on plants of various kinds for the purpose of killing sucking and chewing insects without injury to the plant.

It is understood that the examples given are by way of illustration and not limitation. Esters other than those specifically mentioned can be employed so long as they have more than four carbon atoms. While the principal use of these materials is in insecticidal compositions and for special use as contact poisons, they are in general useful as fungicides, fumigants and disinfectants.

It is understood that wide deviations are possible without departing from the spirit of the invention, the scope of which is to be limited only by the following claims.

What we claim is:

1. As a new compound diisobutyl cyclohexylthiocyanate possessing insecticidal properties.

2. An insecticide comprising a cyclohexyl thiocyanate.

3. The compound cyclohexyl thiocyanate.

4. As a new composition of matter a cyclohexyl thiocyanate.

5. As a new composition of matter an alkyl substituted cyclohexyl thiocyanate.

LEON C. HECKERT.
CHARLES H. PEET.